United States Patent [19]

Raynaud et al.

[11] Patent Number: 4,574,778
[45] Date of Patent: Mar. 11, 1986

[54] PREPARING SELECTIVE SURFACES FOR SOLAR COLLECTORS BY DRY OXIDATION AND SELECTIVE SURFACES SO OBTAINED

[75] Inventors: Guy Raynaud; Francois Morin, both of Longueuil; Louis Brossard, Ste-Julie, all of Canada

[73] Assignee: Hydro-Quebec, Quebec, Canada

[21] Appl. No.: 590,646

[22] Filed: Mar. 19, 1984

[51] Int. Cl.$^4$ .................................................. F24J 2/00
[52] U.S. Cl. .................................... 126/417; 126/901; 204/37.1; 204/38.1
[58] Field of Search ................. 126/417, 901; 427/225, 427/227, 229, 160, 252; 148/11.5 N, 426; 204/37.1, 38.1

[56] References Cited

U.S. PATENT DOCUMENTS

| 3,326,648 | 6/1967 | Provisor | 427/229 |
| 4,031,274 | 6/1977 | Bessen | 427/229 |
| 4,071,659 | 1/1978 | Santala | 126/901 |
| 4,102,709 | 7/1978 | Wenderott et al. | 148/115 N |
| 4,148,294 | 4/1979 | Scherber et al. | 126/901 |
| 4,235,226 | 11/1980 | Scherber et al. | 126/417 |
| 4,330,344 | 5/1982 | Terai et al. | 427/160 |
| 4,442,829 | 4/1984 | Yanagida et al. | 126/901 |

FOREIGN PATENT DOCUMENTS

| 2843571 | 4/1980 | Fed. Rep. of Germany | 126/901 |
| 0198958 | 12/1972 | Japan | 126/901 |
| 0038652 | 3/1977 | Japan | 126/901 |
| 0072950 | 6/1977 | Japan | 126/901 |
| 0020437 | 2/1979 | Japan | 126/901 |
| 2079323 | 10/1981 | United Kingdom | 126/901 |

OTHER PUBLICATIONS

Review Materials for Photothermal Solar Energy Conversion, Walter F. Bogaerts and Carl M. Lampert.
The Selective Solar Absorptance of In Situ-Grown Oxide Films on Metals—D. Douglas and R. B. Pettit.

Primary Examiner—Samuel Scott
Assistant Examiner—Helen A. Odar
Attorney, Agent, or Firm—Oblon, Fisher, Spivak, McClelland & Maier

[57] ABSTRACT

Selective surfaces for photothermal solar collectors consisting of a nickel support, preferably commercial nickel of 99.5% purity, a layer of a porous nickel oxide of about 0.2 μm covering the metallic support, the layer of porous nickel oxide being covered with asperities in the form of a network of nickel oxide discs in which the major portions are oriented at an angle with respect to the vertical. The network of discs has a thickness of about 2 μm. The preparation of these selective surfaces is carried out in the following manner. Thin nickel plates are subjected to a heat treatment by heating and oxidizing in an oxidant gas during a short period of time at a temperature varying between about 1000° C. and 1100° C. The oxidized nickel plates are reduced at a temperature of about 1100° C. in the presence of a reducing gas until the metallic state is obtained. The surrounding temperature is thereafter lowered between 810° and 830° C. and an oxidizing gas is circulated around the plates, at a rate of flow which is sufficient to flush away the reducing gas. The plates are rapidly cooled down to room temperature to give the intended selective surfaces.

11 Claims, 2 Drawing Figures

PREPARING SELECTIVE SURFACES FOR SOLAR COLLECTORS BY DRY OXIDATION AND SELECTIVE SURFACES SO OBTAINED

BACKGROUND OF INVENTION (a) Field of the Invention

The invention relates to selective surfaces for photothermal solar collectors, a process of preparing these selective surfaces as well as solar collectors consisting of such surfaces. More specifically, the invention deals with the preparation of selective surfaces for photothermal solar collectors by dry oxidation at high temperature.

(b) Description of Previous Methods

There are numerous techniques for preparing surfaces for photothermal solar collectors. Most of these techniques are based on well known electrochemical methods or rely simply on the use of absorbing paints. Other methods, which are much more costly but which give also a better performance, rely on various coating processes from the vapor phase.

On the other hand, it is well known that it is relatively easy for the current photothermal collectors to convert substantially the entire solar energy into heat and this can be obtained only if the absorbing material cost is acceptable. However, this is often associated with an important disadvantage with respect to the global thermal efficiency. Depending on its degree of heating, the absorbing surface will have a tendency to re-emit more and more energy in the form of infrared radiation. This loss is even higher when the operating temperature of the collector is high and its coefficient is large.

The problem encountered by the radiation of the collector in the infrared, although important, is resolved with the preparation of materials which are called selective with respect to the solar radiation, i.e. whose coefficient of absorption in the range of the solar spectrum is close to unity and whose emissivity in the infrared is, on the contrary, quite low. Such materials are already known. However, their manufacturing cost is generally quite high, and in certain cases, they cannot sustain high operating temperatures. By including selective and non selective materials, photothermal absorbing surfaces may be classified into four important types:

(1) First, the non selective surfaces with substantially equal coefficients of absorption and emission. This is the behavior which is more often attributed to the various materials. The surface has a coefficient of absorption which is close to one, and is, for example, made of carbon black in an organic binder.

(2) Among the selective surfaces, those formed of a semi-conductor thin film at the surface of a polished metal. The thin film has a high coefficient of absorption within the visible spectrum and is transparent in the infrared range. At the interface, the metal is characterized by a very low emissivity in the visible range as well as in the infrared. The thickness of the film is at the most a few microns. The transfer of energy from the semiconductor to the metal is mainly carried out by phonons and, less extensively, by photoelectric conversion.

(3) The dielectric materials in multiple layers form another category of selective surfaces. High absorption is achieved by multiple interference, a principle widely used in optics, except that, in the present case, the substrate is formed of a polished metal.

(4) It is also possible to produce a selective surface by acting directly on the microscopic morphology of the absorbing surface. The surface can be entirely metallic, but its morphology is such that the absorption of the solar radiation is almost complete while the same surface continues to benefit from a low emissivity in the infrared. This phenomenon may be explained by analogy with the phenomenon of cavity in the electromagnetic theory. Obviously, noble metals are too expensive in practice. However, the preceeding phenomenon is modified when current metals, always oxidized in surface, are used.

For a good review of the materials susceptible to be used as photothermal solar collectors, reference can be made to Walter F. Bogarts and Carl M. Lambert, Review-Materials for Photothermal Solar Energy Conversion, Journal of Materials Science 18 (1983) 2847-2875. It will be noted, in particular, that in the case of nickel, when the absorbing layer is constituted by Ni, $NiO_x$, the absorption coefficient is 0.80 when the material is obtained by evaporation under vacuum and simultaneous thermal oxidation. In this case, the emissivity at 200° C. is 0.1. When the material is obtained by electrodeposition followed by anodization, the absorption coefficient is 0.95 while the emissivity is 0.3 at 300° C. Consequently, the optical properties of these materials seem satisfactory. However, their preparation is rather complex and their optical properties degrade during further oxidation.

In D. L. Douglas and R. B. Pettit, Solar Energy Materials 4, 1981, 383-402, the formation of an oxide layer on a metal in order to produce selective surfaces is described. The method merely consists of oxidizing a metallic sheet, in air or oxygen, in order to produce a compact layer of oxides, without the formation of discs or other surface roughnesses. The measured absorptions were up to 0.84 and the emissivity at 100° C. between 0.06 and 0.39. This is a theoretical study without commercial application.

SUMMARY OF INVENTION

In accordance with an object of the invention, the idea is to provide a typical process for the dry oxidation of nickel until obtaining a layer of oxide whose morphology plays an important role in the production of selective surfaces.

According to another object of the invention, thin nickel plates are subjected to an initial thermal treatment by heating and oxidizing in an oxidant gas during a short period of time at a temperature varying between about 1000° C. and 1100° C. Then, the oxidized nickel plates are reduced to the metallic state at a temperature of about 1000° C. to 1100° C. in the presence of a reducing gas. Thereafter, the surrounding temperature is decreased to between about 810° and 830° C., and the reducing gas is quickly replaced by an oxidizing atmosphere. The plates are then cooled down rapidly to room temperature and finally, the desired selective surfaces are obtained. The preparation of the selective surfaces for solar collectors is normally carried out in a furnace.

The starting material is preferably commercial nickel of 99.5% purity, which has been cold rolled into about 200 $\mu$m thickness plates.

The initial treatment is preferably carried out by rapidly heating in air up to about 1000° C. to 1100° C. followed by oxidizing during about 5 minutes at that temperature.

According to another preferred embodiment of the invention, reduction of the nickel plates takes place in an atmosphere of argon containing a reducing gas. Preferably, the atmosphere of argon contains about 1% hydrogen or can be replaced by $CO-CO_2$ mixture.

According to another preferred embodiment of the invention, the plates are treated in a furnace and the argon containing a reducing gas is introduced into the furnace at a flow of about 20 cc/min. during about 1 hour.

According to another preferred embodiment of the invention, the temperature of the furnace is then decreased to about 820° C. The reducing step is followed by the introduction of an oxidant atmosphere made of pure and dry oxygen in the furnace at a flow higher than 200 cc/min., during about 10 minutes.

According to another object, the invention concerns selective surfaces for photothermal solar collectors consisting of a metallic nickel support, a layer of porous nickel oxide about 0.2 $\mu$m thick covering the metallic support, the layer of porous nickel oxide being covered with a network of nickel oxide discs, the majority being oriented at an angle with respect to the vertical, the network of discs having a thickness of about 2 $\mu$m. The metallic support is preferably made of commercial nickel at 99.5% purity.

According to another object, the invention is concerned with solar collectors comprising selective surfaces as described above.

The invention will now be illustrated by means of the following example which is given merely as illustration.

EXAMPLE

Commercial nickel (99.5% purity) (so-called Nickel 200) is cold rolled into 200 $\mu$m thick plates. After an initial heat treatment in a furnace consisting of a rapid heating in air to a temperature of 1100° C. and an oxidation for 5 minutes at that temperature, the plates of nickel are reduced to 1100° C. in an atmosphere or argon and 1% hydrogen (flow of 20 cc/min.). The temperature is then rapidly decreased to 820° C. before introducing pure and dry oxygen in the furnace at a high flow (>200 cc/min.). This oxidation lasts for 10 minutes after which the flow of oxygen is stopped and the furnace is cooled as rapidly as possible. In that manner, a network of platelets or discs of NiO grown on a very thin layer of porous oxide (<0.2 $\mu$m) is then obtained.

The resulting surface morphology enables to obtain selective surfaces with high absorption for wave lengths lower than 2 $\mu$m and a low emissivity for wave lengths higher than 2 $\mu$m.

The initial oxidation followed by reheating at 1100° C. enables to multiply the nucleation sites density for the final oxidation. This density increase, as well as the presence of impurities in commercial nickel leads to the formation of NiO platelets. Finally, the NiO valence band is decreased by the doping effect resulting from these impurities and the transition wave length is brought closer to its optimum value (2 $\mu$m). The surfaces obtained in this manner can be used in photothermal solar systems for low temperature (T<200° C.) as well as systems using solar radiations concentrators.

According to this technique, plates measuring 35 cm$^2$ were produced. For $0.38<\lambda<1.8$ $\mu$m where $\lambda$ is the wave length of the light, a good absorption $\alpha$ higher than 92%, and a low emissivity factor $\epsilon$ at 100° C., about 20%, are obtained.

DESCRIPTION OF PREFERRED EMBODIMENTS

Figure 1:
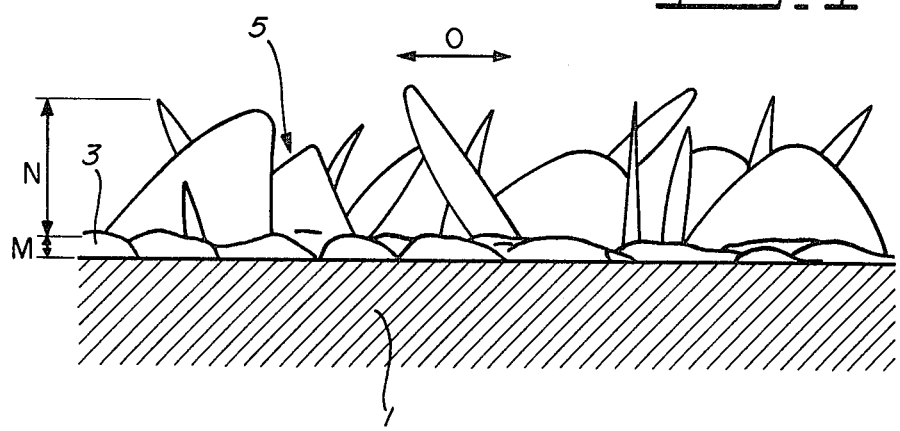
FIG. 1 is a cross-section view on an enlarged scale of a selective surface according to the invention.
Figure 2:
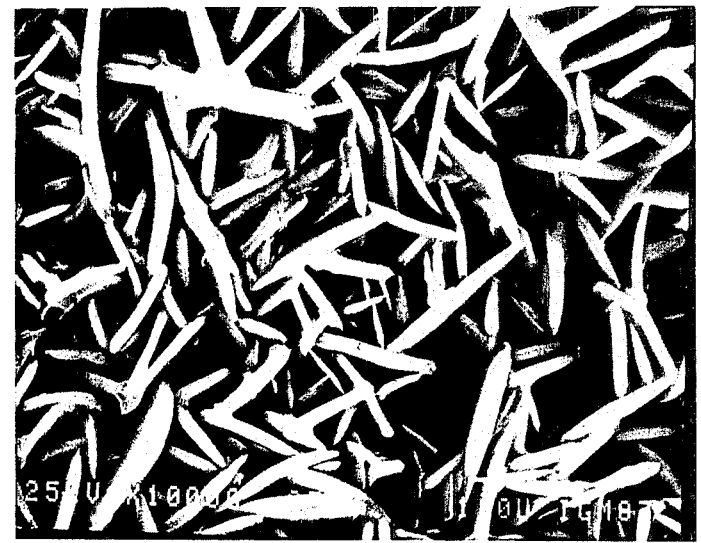
FIG. 2 is a micrograph obtained with a scanning electron microscope of the selective surface according to the invention.

It will be seen that this surface consists of a metallic support 1 of commercial nickel at 99.5% purity. A layer of porous nickel oxide 3 whose thickness M is about 0.2 $\mu$m covers the metallic support. The layer of porous nickel oxide 3 is covered with a network of platelets 5 mainly oriented at an angle with respect to the vertical, as shown in the drawings. For example, it will be noted that the distance O between the apex of certain platelets is about 1 $\mu$m, and that the thickness N of the layer of platelets is about 2 $\mu$m, which gives an idea of the dimension and of the orientation of the platelets.

The absorption coefficient $\alpha$, and the emissivity $\epsilon$, are therefore comparable to that of known selective coatings. A major advantage of the product according to the invention resides in the stability of the film during its use. As a matter of fact, the stability is largely superior to that of the selective surfaces obtained by chemical deposit when the product is used under isothermic or cyclic conditions. The layer is prepared at about 820° C. while its temperature of operation is of the order of 200° C. up to 500° C., at which the oxidation rate becomes negligible. In the case of a surface prepared by chemical deposition, below 100° C., any higher temperature of use might induce substantial alterations in the optical characteristics of the material.

Finally, the nickel oxide formed on nickel at high temperature exhibits an excellent resistance to cyclic oxidation because of two main factors. First, there is a great similarity between the thermal expansion coefficients of the oxide and that of the metal. The second factor is the remarkable adhesion of NiO grown at high temperature on nickel particularly, in the case of thin oxide layers. This is observed by the absence of a thick porous inner layer at thicknesses lower than about 10 $\mu$m, because according to the invention, the thickness of the oxide is about 0.2 $\mu$m.

Finally, it will be noted, that the oxidation process at high temperature only requires a simple equipment, that it can be carried out continuously and that the price of the basic material is rather low because commercial nickel is preferably used according to the present invention.

We claim:

1. Process for the preparation of selective surfaces for photothermal solar collectors comprising cold rolling nickel at 99.5% purity into plates of about 200 $\mu$m thickness, subjecting these plates to an initial treatment in an oven, said treatment including a rapid heating in air at a temperature of about 1000° C. to 1100° C. followed by oxidation for about 5 minutes at said temperature, reducing the oxidized nickel plates in an atmosphere of argon containing about 1% hydrogen, said atmosphere of argon being introduced into the furnace at a flow of about 20 cc/min. for about 1 hour, rapidly decreasing the temperature of the furnace to a temperature of about 820° C. and introducing pure and dry oxygen into the furnace for about 10 minutes, so as to flush away all hydrogen, stopping the flow of oxygen, rapidly cooling the plates to room temperature thereby obtaining the selective surfaces desired.

2. Process for the preparation of selective surfaces for photothermal solar collectors which comprises subjecting thin nickel plates to an initial heat treatment by heating and oxidizing in an oxidant gas at a temperature of about 1000° C. to 1100° C. followed by the introduction of a reducing gas until metallic state is obtained, then decreasing the surrounding temperature to between about 810° and 830° C., circulating around the plates reduced to metallic state an oxidizing atmosphere with a flow sufficient to flush away the reducing gas, rapidly cooling down the plates to room temperature thereby obtaining the desired selective surfaces.

3. Process according to claim 2, wherein the nickel plates are at 99.5% purity.

4. Process according to claim 2, wherein the nickel plates are at 99.5% purity which has been cold rolled into plates of about 200 μm thickness.

5. Process according to claim 2, wherein the initial treatment comprises rapidly heating in air at a temperature of about 1000° C. to 1100° C. followed by oxidation for about 5 minutes at that temperature.

6. Process according to claim 2, wherein the reduction of the nickel plates is carried out in an atmosphere of argon containing a reducing gas.

7. Process according to claim 6, wherein the atmosphere of argon contains about 1% hydrogen.

8. Process according to claim 6, wherein the reducing atmosphere comprises a mixture of $CO-CO_2$.

9. Process according to claims 6, 7 or 8, wherein the plates are treated in a furnace, and the argon containing the reducing gas is introduced into the furnace where it circulates for about 1 hour.

10. Process according to claim 2, which is carried out in a furnace, and following the reducing step, the temperature of the furnace is decreased to about 820° C. and the oxidizing atmosphere consists of pure and dry oxygen.

11. Process according to claim 10, wherein the introduction of pure and dry oxygen into the furnace lasts about 10 minutes.

* * * * *